US010992648B2

(12) United States Patent
Hayes et al.

(10) Patent No.: US 10,992,648 B2
(45) Date of Patent: *Apr. 27, 2021

(54) SECURE TIME COMMUNICATION SYSTEM

(71) Applicant: Blue Armor Technologies, LLC, Houston, TX (US)

(72) Inventors: John William Hayes, Reno, NV (US); Douglas A. Laird, Los Gatos, CA (US); Charles Andrew Gram, Reno, NV (US)

(73) Assignee: Blue Armor Technologies, LLC, Houston, TX (US)

( * ) Notice: Subject to any disclaimer, the term of this patent is extended or adjusted under 35 U.S.C. 154(b) by 227 days.

This patent is subject to a terminal disclaimer.

(21) Appl. No.: 15/530,714

(22) Filed: Feb. 16, 2017

(65) Prior Publication Data

US 2018/0234393 A1    Aug. 16, 2018

(51) Int. Cl.
*H04L 29/06* (2006.01)
*H04L 9/00* (2006.01)
*H04L 9/08* (2006.01)
*H04L 9/06* (2006.01)
*G06F 1/14* (2006.01)

(52) U.S. Cl.
CPC ........... *H04L 63/0428* (2013.01); *G06F 1/14* (2013.01); *H04L 9/002* (2013.01); *H04L 9/0643* (2013.01); *H04L 9/0872* (2013.01); *H04L 63/145* (2013.01)

(58) Field of Classification Search
CPC ... H04L 63/0428; H04L 9/002; H04L 63/145; G06F 1/12
USPC ....................................................... 713/168
See application file for complete search history.

(56) References Cited

U.S. PATENT DOCUMENTS

| 2005/0058149 A1* | 3/2005 | Howe ..................... H04L 47/17 370/428 |
| 2007/0133591 A1* | 6/2007 | Shatford ............. H04L 63/0442 370/457 |

FOREIGN PATENT DOCUMENTS

CA          2649686 A1 *  11/2007  ............. G06F 21/34

OTHER PUBLICATIONS

Cyber Physical Systems Public Working Group *DRAFT Timing Framework for Cyber-Physical Systems, Technical Annex*, Release 0.8 (Sep. 2015) This paper states that every network element has a clock subsystem.

(Continued)

*Primary Examiner* — Evans Desrosiers
(74) *Attorney, Agent, or Firm* — Crain, Caton & James, P.C.; James E. Hudson, III

(57) ABSTRACT

Methods and apparatus for a Secure Time Communication System (10) are disclosed. One embodiment of the invention provides secure and non-interactive communication of clock information over an unsecured communications channel. This communication provides perfect forward secrecy, while detecting and blocking message spoofing, message replay, denial of service and cryptographic performance attacks. This mechanism also bounds the effect of message delay manipulation. The mechanism consists of two components, a filtered time encryptor (16) and a filtered time decryptor (28). The filtered time encryptor (16) produces a message in two parts; a time token followed by an encrypted message body. The time token is used as a filter to detect most attacks and to determine the message key.

10 Claims, 5 Drawing Sheets

(56) References Cited

OTHER PUBLICATIONS

Pierluigi Paganini *Hacking NTP Servers from Long-Distance with Low Cost Devices* (May 29, 2016) Paganini explains that an attacker may shift time on a network server by sending the server a forged radio time signal.
Cyber Physical Systems Public Working Group, DRAFT Timing Framework for Cyber-Physical Systems, Technical Annex, Release 0.8, Sep. 2015.
Paganini, Hacking NTP Servers from Long Distance with Low Cost Devices, securityaffairs.com, May 29, 2016.

* cited by examiner

PRIOR ART

US 10,992,648 B2

SECURE TIME COMMUNICATION SYSTEM

FIELD OF THE INVENTION

One embodiment of the present invention pertains to a secure, non-interactive method for communicating secured time. More particularly, one embodiment of the invention comprises a filtered time encryptor and a filtered time decryptor, which work in combination to provide secure and non-interactive communication of clock information over an unsecured communications channel. This communication provides perfect forward secrecy, while detecting and blocking message spoofing, message replay, denial of service and cryptographic performance attacks.

CROSS-REFERENCE TO RELATED PENDING PATENT APPLICATIONS & CLAIM FOR PRIORITY

None.

FEDERALLY SPONSORED RESEARCH OR DEVELOPMENT

None.

BACKGROUND OF THE INVENTION

According to a paper by the Cyber Physical Systems Public Working Group entitled *DRAFT Timing Framework for Cyber-Physical Systems, Technical Annex, Release 0.8* (September 2015), "every [computer] network element has a clock subsystem (often just called a 'clock')." This clock typically contains an oscillator that generates signals that are used to provide a sense of time that is used in that network element or system.

FIG. 1 shows a typical, generic clock waveform.

Time is represented as a continuing series of pulses having a fixed duration, and a fixed separation along the x-axis. The pulses have a constant frequency, meaning that there is a pre-defined and unvarying rate at which events, measured by this framework of time, may occur.

"Time" is a measurement of an interval between two events, or the duration of an event. The progression of time, as measured or determined by an electronic system, controls the implementation of instructions, activities or events.

If a network is penetrated by an unauthorized user, and the time clock within the network is somehow disturbed or altered, the entire network may be compromised or rendered inoperative.

As an example, an article by Pierluigi Paganini entitled *Hacking NTP Servers from Long-Distance with Low Cost Devices* (May 29, 2016) explains that an attacker may shift time on a network server by sending the server a forged radio time signal. Computer servers generally use the Network Time Protocol to administer their internal clock. A time signal from a satellite or a terrestrial radio station supplies a signal which is recognized as the correct time. If a hacker can send the network an incorrect time signal, the operation of the network may be impaired.

The development of a system that would defend networks against "time hacking" would be a major technological advance, and would satisfy long-felt needs in the computer security industry.

SUMMARY OF THE INVENTION

One embodiment of the present invention is a Secure Time Communication System that defends computer networks against "time-hacking." One embodiment of the invention provides secure and non-interactive communication of clock information over an unsecured communications channel. This communication provides perfect forward secrecy, while detecting and blocking message spoofing, message replay, denial of service and cryptographic performance attacks. This mechanism also bounds the effect of message delay manipulation. The mechanism consists of two components, a filtered time encryptor and a filtered time decryptor. The filtered time encryptor produces a message in two parts; a time token followed by an encrypted message body. The token is used as a filter to detect most attacks and to determine the message key.

The present invention protects the definition or determination of time measurement within an electronic system or network, and thwarts unauthorized use based on interference or tampering with that internal definition or determination of time.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

FIG. 1 is a schematic diagram of a series of pulses which may used to regulate the time clock in a computer and/or network.

FIG. 2 provides a view of one embodiment of the Secure Time Communication System.

A DETAILED DESCRIPTION OF PREFERRED & ALTERNATIVE EMBODIMENTS

I. Overview of the Invention

Figure 1:
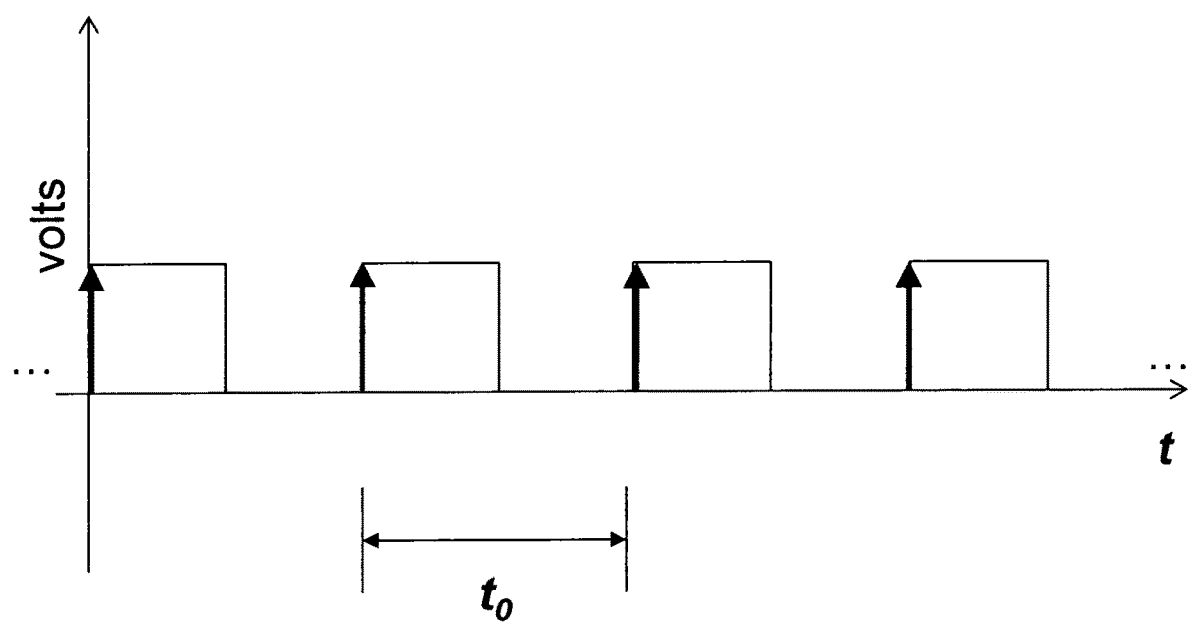

One embodiment of the present invention pertains to a secure, non-interactive method for communicating secured time. More particularly, one embodiment of the invention comprises a filtered time encryptor and a filtered time decryptor, which work in combination to provide secure and non-interactive communication of clock information over an unsecured communications channel. This communication provides perfect forward secrecy, while detecting and blocking message spoofing, message replay, denial of service and cryptographic performance attacks.

The present invention preserves and/or defends the recognized value of time within an electronic device or network to prevent unauthorized tampering with or access to the device or network.

II. Description of One Embodiment of the Invention

Tokens, which are strings of data, are generated by using a cryptographic hash of a synchronized clock and a token key that is pre-shared with the filtered time encryptor and the filtered time decryptor(s). A cryptographic hash function is a mathematical expression, which, takes an input, transforms it, and returns a fixed-size output. For example, using a cryptographic hash algorithm with 256 bits of output, 256 bits of token key information and 64 bits of clock information are used as the inputs. The first 64 bits of the resulting hash output are used as the time token. The remaining 192 bits of hash output are used as a message key to encrypt the message body. A message key is a string of bits which is used to encrypt, or to decrypt, a message.

This embodiment of the present invention perfect forward secrecy with each message body encrypted with a unique time dependent message key. The message body contains the full resolution clock information and may contain additional message data. The filtered time encryptor and the filtered time decryptor may use a lower resolution clock for token generation. The full resolution clock can be determined after the message body has been decrypted with the message key. Comparing the clock value used for token generation against the clock value included in the message body insures that the message body has been correctly decrypted.

Time tokens must be generated by both the filtered time encryptor and the filtered time decryptor. A time token is a time sensitive message header that is used to determine the message key. A time token is generated with a specific clock value. The time token is a component of a time token protected message.

Each time token is the partial output of a cryptographic hash. The only way a filtered time decryptor can recognize a valid time token is to match a received token against the set of tokens that is currently valid. Multiple time tokens may be valid simultaneously to account for the effects of clock and propagation delay variances.

Each filtered time decryptor maintains a cache of expected valid tokens. As the time tokens are time dependent, the number of time tokens required to be maintained depends upon the resolution of the clock used for token generation and amount of error allowed between the time token generator and the time token filter. This error includes the frequency and phase drift between the source clock and the local clock in the filtered time decryptor and the variance in the propagation delay. For example, a time token cache maintaining 1000 time tokens with a 100 µs resolution results in an overall time window of 0.1 seconds. Within the time token cache, the time tokens are maintained in a hash table, content addressable memory (CAM) or other suitable mechanisms.

The maintenance of time tokens involves the aging and removal of older time tokens from the table and the calculation and addition of new time tokens to the table. In addition to the time token value, each hash table or CAM entry includes the clock value used to generate the time token and the hash output from the time token generation process, providing the message key.

Time token recognition is performed when a message is received by a filtered time decryptor. A lookup in the time token cache is performed for the received time token. If the time token is not found, the entire message is discarded. If the time token is found, its corresponding time token message key is used to decrypt the encrypted time message. The clock information in the hash table entry is used to validate the decrypted time message. If the clock information decrypted from the encrypted time message does not match the clock information used to generate the time token, the message is discarded. A lower resolution clock may be used for time token generation, while the full resolution clock is contained in the decrypted message body.

Because the determination of time token validity is a simple table lookup, it requires the same low computational effort to determine that a time token is valid or is invalid. The bulk of the computational effort occurs in the maintenance of the time token cache which is managed independently from message processing. Once a time token and its associated message key has been used, the time token entry is invalidated and may be removed from the token cache. Time tokens expire and become invalid once they fall outside of the time window established by the time token cache.

Analysis

The probability of an attacker using a valid time token in a brute force attack is $$p(n; d) = \frac{d!}{d^n(d-n)!}$$

where p is the probability, n is the number of time tokens in use in the time token cache and d is the number of unique time tokens available. d is calculated as $d=2^b$ where b is the size in bits of the time token. As d! is not directly calculable for large numbers, the approximation $p(n; d) \approx 1-e^{-n^2/(2 \times d)}$ is used. Using the above example with a cache of 1000 time tokens, the probability of an attacker using a valid time token is approximately $2.70894^{-4}$. For comparison, the probability of an attacker using a valid time token when using a cache of 10,000 time tokens is approximately $2.7105^{-12}$. The probability of an attacker using a valid time token can be reduced by increasing the time token size.

An attacker must test his attacks against the filtered time decryptor because time tokens are the partial output of a cryptographic hash, and there is no plaintext to compare against. This limits the attack rate to the maximum message rate of the filtered time decryptor. The time tokens in the time token cache are continuously being expired and refreshed, further complicating an attacker's efforts.

Attack Detection

A message with an invalid time token or an invalid message body is considered an attack. An attack may be caused by a spoofed message or the replay of a previous message which has been invalidated or removed from the time token cache. Denial of service attacks are limited to the maximum message rate of the filtered time decryptor. The time token filter filters out attacks at the maximum message rate while accepting messages with valid time tokens. Cryptographic performance attacks must first pass through the time token filter where they are filtered out before message body decryption is attempted.

Limiting Message Delay Manipulation

Message delay can be detected and bounded based on the window of time covered by time tokens in the time token cache. Messages delayed outside of this window are invalid. The time token cache management and aging process can invalidate (without removing) time tokens that have aged out of the time window, enabling the detection of message delay manipulation. Messages classified as delayed must have a valid time token and message body, otherwise they are indistinguishable from other forms of attack.

Initialization

The difference between the source clock and filtered time decryptor's local clock, including propagation delay must be within the time window of the token cache, requiring that the filtered time decryptor's local clock is synchronized to the source clock prior to operation. One approach to clock synchronization is to use a second clock with a lower resolution and a wider window during initialization, switching to a higher resolution clock once the filtered time decryptor's local clock is within the operational time window. The filtered time encryptor can communicate both clocks independently and the filtered time decryptor can generate both low and high resolution time tokens for its time token cache until high resolution time tokens are recognized. Once synchronized, the filtered time decryptor can cease generating low resolution time tokens.

Applicability

This approach can be used to securely communicate time over broadcast communication systems with multiple filtered time decryptors. The limiting factor is the underlying key management. For example, using a broadcast system such as an FM sideband or GPS, timing information can be securely communicated to multiple filtered time decryptors simultaneously using a single group key. To protect against a compromised filtered time decryptor compromising the entire system, a unique token key should be established for each filtered time decryptor, limiting the effect of a compromised filtered time decryptor. Filtered time decryptors receiving messages generated with a token key different from their own will discard the received messages as invalid.

This approach can also be used in conjunction with interactive time protocols such as NTP and PTP. When used in this way, each participating entity should have their own unique token key and token cache mechanism to generate and authenticate messages. This approach is tolerant of a lossy communications channel, although it cannot detect the absence of lost messages.

III. Operation of One Embodiment of the Invention

Figure 2:
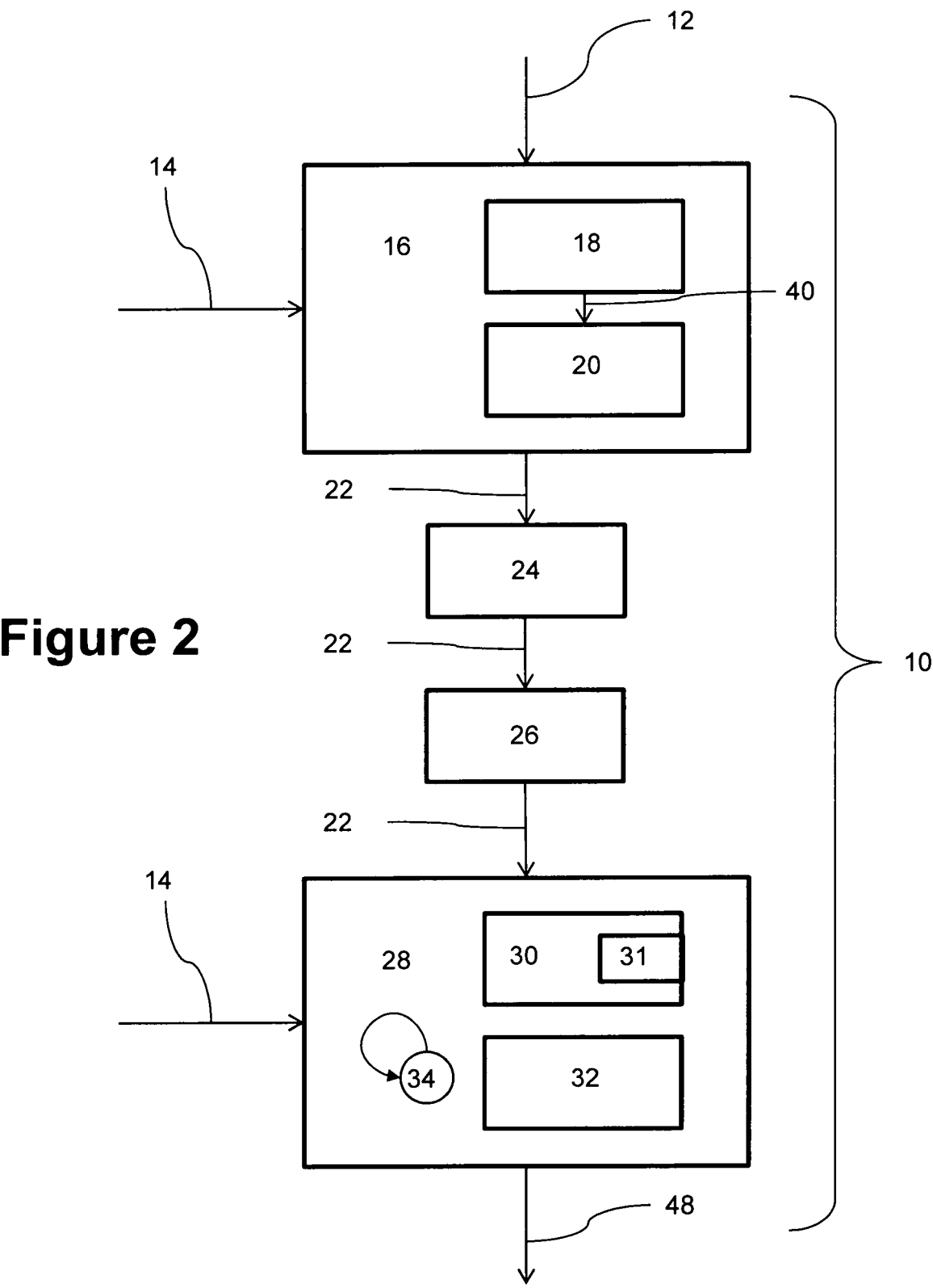

In one implementation of the invention, as shown in FIG. 2, a source clock 12 and a cryptographic key 14 is presented as inputs to a filtered time encryptor 16. The filtered time encryptor 16 contains a time token generator 18, providing a means for generating time tokens. The filtered time encryptor 16 also contains a message encryptor 20, providing a means for encrypting messages. The filtered time encryptor 16 is connected to a transmitter 24. The transmitter is used to transmit time token protected messages 22 to the receiver 26.

A receiver 26 is connected to a filtered time decryptor 28. The filtered time decryptor 28 contains a time token filter 30 providing a means for filtering time tokens. The time token filter 30 contains a time token cache 31. The filtered time decryptor 28 also contains a message decryptor 32, providing a means for decrypting messages. The filtered time decryptor 28 also contains a local clock 34.

Figure 3:
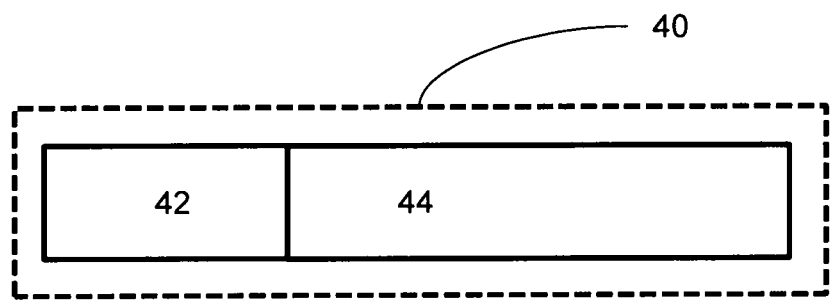
FIG. 3 shows how the output of a cryptographic hash is used to create a time token and a time token message key.

Within the filtered time encryptor 16, the time token generator 18 takes the source clock 12 and the cryptographic key 14 and using a cryptographic hash algorithm, produces a cryptographic hash output 40. The cryptographic hash output 40 is divided into a time token 42 and a time token message key 44 as shown in FIG. 3.

In a preferred embodiment, HMAC-SHA-256 is used as the hash algorithm with a 64 bit source clock 12 and a 256 bit cryptographic key 14 as inputs. Other suitable hash algorithms that are familiar to persons having ordinary skill in this art will recognize that other hash algorithms may be employed to implement the present invention.

After hashing, the resulting cryptographic hash output 40 is 256 bits in length. The first 64 bits are used as the time token 42 and the remaining 192 bits are used as the time token message key 44. The source clock 12 is often specified in terms of seconds and fractions of a second. In the above embodiment, a 64 bit source clock 12 would likely be composed of a 32 bit seconds field and a 32 bit fractions of a second field. The precision in the fraction of a second field is determined by the precision generator of the source clock 12. For highly precise clock sources, for example where time is can be accurately expressed to the nanosecond, the source clock 12 should be expressed with lower precision for the purpose of token generation. A simple approach is to right shift the fraction of a seconds field a few bits. The full precision fraction of a second field should be used to generate the encrypted time message 46.

The message encryptor 20 uses the time token message key 44 to encrypt the source clock 12 resulting in an encrypted time message 46. Using a unique time token message key 44 for each encrypted time message 46 provides perfect forward secrecy, meaning that learning the time token message key 44 for a single encrypted time message 46 does not affect the security of any other encrypted time message 46. Information in addition to the source clock may be included and encrypted in the encrypted time message 46.

Figure 4:
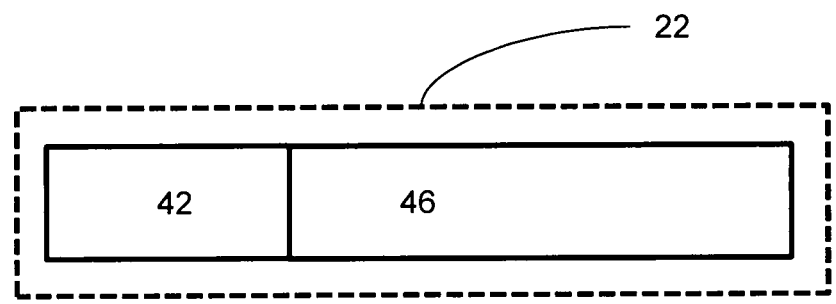
FIG. 4 shows a schematic of a time token protected message.

The filtered time encryptor 16 concatenates the time token 42 and the encrypted time message 46 to form a time token protected message 22 as shown in FIG. 4. The time token protected message 22 is then transmitted by the transmitter 24.

Since the time token protected message 22 consists of a time token 42 and an encrypted time message 46, it can be subsequently transmitted over an unprotected communications channel, such as being broadcast on an RF radio, sent over a computer network, communicated along an optical fiber or even communicated audibly as a sequence of tones.

The receiver 26 receives the transmitted time token protected message 22 and communicates it to the filtered time decryptor 28. The filtered time decryptor 28 first filters received time token protected messages 22 using a time token filter 30. To determine which time token protected messages 22 are valid, the time token filter 30 maintains a time token cache 31 of valid time tokens 42, with each time token 42 also including the clock value used to generate the time token 42 and the associated time token message key 44. Multiple time tokens 42 are used in the time token cache 31 to combat the effects of unreliable communications channel, clock drift and clock skew between the local clock 34 and the source clock 12 and variations in communications latency. To overcome these effects, a "window" where multiple clock values are recognized is maintained. In one embodiment, a time token cache 31 maintaining 1000 time tokens 42 with a 100 μs resolution results in an overall time window of 0.1 seconds. Time tokens 42 that were generated using a time value that falls within this window will be recognized. The maintenance of time tokens 42 in the time token cache 31 involves the aging and removal of older tokens from the cache and the calculation and addition of new tokens to the cache. The time token cache 31 can be constructed using processor(s) and memory with a hash table data structure, using hardware content addressable memory (CAM) technology or other hardware technologies.

When the time token filter 30 receives a time token protected message 22, it attempts to locate matching time token 42 in the time token cache 31. If no matching time token 42 is found, the time token protected message 22 is discarded. If a matching time token 42 is found in the time token cache 31, the corresponding clock value used to generate the matching time token 42 and the associated time token message key 44 are retrieved from the time token cache 31 and presented to the message decryptor 32 along with the encrypted time message 46. The time token cache entry is invalidated.

The message decryptor 32 decrypts the encrypted time message 46 using the time token message key 44 to produce the decrypted clock 48. To insure proper decryption, the decrypted clock 48 should be compared against the clock value used to generate the time token 42. The clock value used to generate the time token 42 should be the same as the decrypted clock 48 or a lower precision value of the decrypted clock 48. The decrypted clock 48 can be used to adjust the local clock 34. If additional message data was included and encrypted in the encrypted time message 46, that message data is now available to the filtered time decryptor 28.

In order for the filtered time decryptor 28 to decrypt a time token protected message 22, its local clock 34 must be synchronized with the source clock 12 such that a received time token 42 falls within the window of time tokens 42 in the time token cache 31. In a preferred embodiment, a second source clock 12 is used with a much lower clock resolution and a wider window during the local clock 34 synchronization. For instance, the initialization clock resolution can be 1 second with a 300 second window. This allows a much wider range of clock values to be received and once one value is received and properly decrypted, the full resolution of the clock can be obtained from the decrypted clock 48.

IV. Examples

The following examples are provided to further explain to the reader the operation of the present invention. These example are supplied to enhance the reader's understanding, but are not presented to limit the scope of the embodiments of the present invention, or the scope of the Claims.

Figure 5:
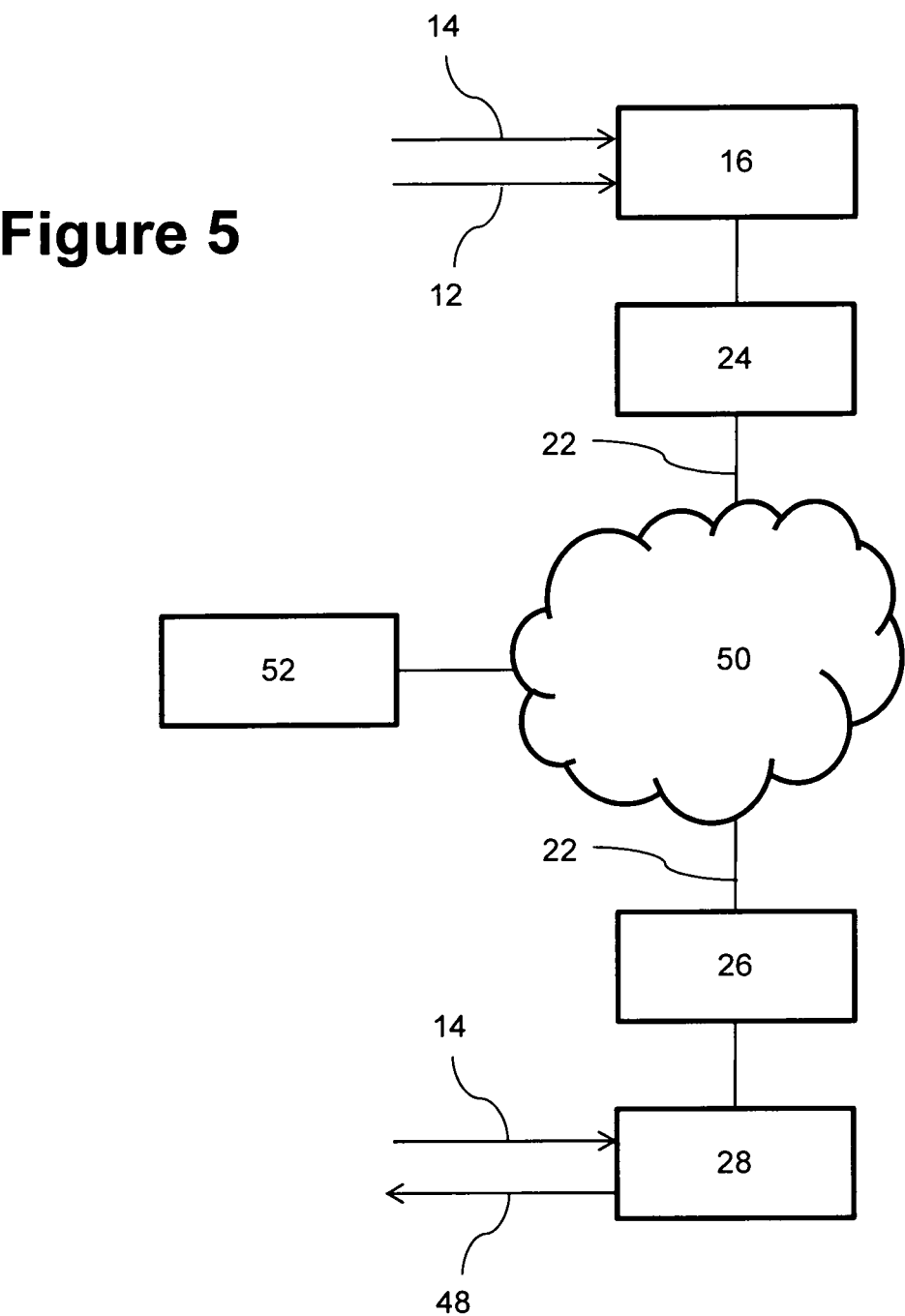
FIG. 5 shows an example of an implementation of one embodiment of the Secure Time Communication System.

FIG. 5 shows one particular example of the present invention in operation, where time token protected messages 22 are being communicated across an unsecured communications channel 50. The time token protected messages 22 each contain an encrypted time message 46 derived from a source clock 12. If the source clock 12 has a resolution of 0.000001 seconds, that clock is accurate to 1 microsecond or one millionth of a second. This is the accuracy of the source clock 12. To operate, the filtered time decryptor 28 maintains a time token cache 31, containing expected time token 42 values. Maintaining the time token cache 31 is the process that, as time advances, removes time tokens 42 that now fall outside of the time window and add new time tokens as the time window advances. This process is described in detail below. If the filtered time decryptor 28 uses the source clock 12 at the full resolution of 0.000001 seconds, the time token cache 31 would have to generate 1,000,000 time tokens 42 per second. While this is possible, it is very computationally expensive while adding little value to the solution. Therefore, in this implementation, the time tokens 42 are generated using a lower resolution clock. For the purpose of generating time tokens 42, the resolution of the source clock 12 is reduced to 0.001 seconds, 1 millisecond or one thousandth of a second. Using the source clock 12 at this lower resolution now only requires the time token cache 31 to generate 1,000 time tokens 42 per second. Time values are often communicated in terms of seconds and fractions of a second. The seconds are counted from an agreed upon start time, known as an epoch, for example Jan. 6, 1980 at 12:00 AM. Thus, a time value of 12345678.123456 means 12345678 seconds since the beginning of epoch plus 0.123456 seconds. Using the above reference clock 12 example, the full resolution clock would be 12345678.123456 and the lower resolution clock would be 12345678.123.

The time token cache 31 in the filtered time decryptor 28 can only recognize time tokens 42 that fall within a time window. In order to recognize a time token 42, is must be contained in the time token cache 31. The time token cache maintains a series of time tokens 42, with each time token 42 being generated with a different clock value. That is, the time tokens 42 in the time token cache 31 must have been generated from a source clock 12 whose time is between time A and time B. For example, the invention may utilize a time window of one second. The decryptor would recognize time tokens 42 generated from a source clock 12 with a reduced resolution with a value between 12345678.000 and 12345678.999.

In an alternative implementation, a one second time window would extend between the values of 12345678.500 to 12345679.499. The time values of the boundaries of the time window are arbitrary. Although a time window of one second has been used in this example, the time window can be any duration, as long as the time token cache 31 has the resources to maintain the entire time window. Those resources are usually sufficient computing power and the storage resources to store time token cache 31 entries. The time token cache 31 must maintain each time token 42 within the time window. For a one second time window and using a clock resolution of 0.001 seconds, one thousand time tokens 42 are required to span the window. For a longer duration time window of three seconds, three thousand time tokens would be required at the same clock resolution of 0.001 seconds.

The time token 42 derived from the cryptographic hash output 40 of a cryptographic hash function that uses a cryptographic key 14 and the source clock 12 at a reduced resolution as inputs. A shown in FIG. 3, a portion of the cryptographic hash output 40 is used as the time token 42 and a different portion is used as the time token message key 44. When the time token cache 31 is generating time tokens 42, it is also generating time token message keys 44. The time token 42, the associated time token message key 44 and reduced resolution clock value used to generate the time token 42 are all stored in the time token cache 31. This enables the time token cache 31 to provide the time token message key 44 and the reduced resolution clock value when a time token 42 is matched.

Once the time token cache 31 has initially been populated with time tokens, and their associated time token message keys 44 and the reduced resolution clock used to generate each time token 42, the time token cache 31 must be maintained. The time window moves forward in time. This means the time window, as described by its boundaries, is constantly moving forward in time. Going back to the previous example of a time window of one second with the time boundaries of 12345678.000 and 12345678.999, the leading boundary is 12345678.999 and the trailing boundary is 12345678.000. Both of these boundaries advance at the same rate. When the leading boundary advances, new time tokens 42 must be calculated and placed in the time token cache 31. When the trailing boundary advances, time tokens 42 that are already in the time token cache 31 that are no longer within the time window are expired and are removed from the time token cache 31. For example, as the leading boundary advances from 12345678.999 to 12345679.000, a new time token 42 using the clock value of 12345679.000 is generated and placed in the time token cache 31. As the trailing boundary advances from 12345678.000 to 12345678.001, the time token 42 in the time token cache generated from the clock value 12345678.000 is expired and removed from the time token cache 31. This process repeats continuously to maintain the time token cache 31.

To securely communicate a source clock 12, a filtered time encryptor 16 uses a cryptographic key 14 and the value of the source clock 12 at a reduced resolution as inputs to a cryptographic hash function, producing the cryptographic hash output 40. A shown in FIG. 3, a portion of the cryptographic hash output 40 is used as the time token 42 and a different portion is used as the time token message key 44. The message key 44 is then used to encrypt the source clock 12 at full resolution. Additional message data may also be encrypted with the source clock. The result of the encryption is the encrypted time message 46. The time token 42 and the encrypted time message 46 are taken together to form a time token protected message 22. This is shown in FIG. 4. The time token protected message 22 is sent to a transmitter 24 which sends the time token protected message 22 via an unsecured communications channel 50 to a receiver 26.

A receiver 26 receives a time token protected message 22 and forwards it to the filtered time descriptor 28. The filtered time descriptor 28 takes the time token 42 from the time token protected message 22 and, using the time token 42 as the input search value to the time token cache 31, attempts to locate a matching time token 42. If there is no matching time token 42, then the time token protected message 22 is discarded. If there is a matching time token 42 in the time token cache 31, the associated time token message key 44 and reduced resolution clock value used to generate the time token 42 are all retrieved. The encrypted time message 46, obtained from the time token protect message 22 and the time token message key 44 are provided to the message decryptor 32. The message decryptor 32 decrypts the encrypted time message 46. The output from the message decryptor should be the full resolution source clock value. The output from the message decryptor is compared to the reduced resolution clock value used to generate the time token 42. If both values, compared at the reduced resolution, do not match, the time token protected message 22 is discarded. For example, if the reduced resolution clock value is 12345678.123 and the decrypted source clock value is 12345678.123456, then the values match when compared at the reduced resolution. If the reduced resolution clock value is again 12345678.123 and the decrypted source clock value is 234532.659342, the match failed and the time token protected message 22 is discarded. If both values, compared at the reduced resolution, match, then the decrypted encrypted time message 46 is used as the decrypted clock 48 and the time token entry in the time token cache 31 is invalidated and removed from the time token cache 31.

As the time token protected message 22 traverses an unsecured communications channel 50, between the transmitter 24 and the receiver 26, it is subject to various forms of attack from an attacker 52. The time token protected message 22 has two layers of protection; each encrypted time message 46 is encrypted with a different time token message key 44. This provides what is known as "perfect forward secrecy." Perfect forward secrecy means that the discovery or compromise of a single message does not affect the secrecy of any other message. In the present invention, this means that is the source clock is accurately decrypted from encrypted time message 46 by an attacker 52, the determination of the time token message key 44 used to encrypt that specific encrypted time message 46 cannot be used to decrypt any other encrypted time message 46. This makes brute force cryptographic attacks on the encrypted time message very difficult. The determination of the time token message key 44 is performed after a time token 42 have been located in the time token cache 31. This is the second layer of protection. The time token filter 30 and the time token cache 31 have been designed to make various forms of attack nearly impossible. If we are using a time token 42 that is 64 bits long, the total number of unique time tokens is $2^{64}$ or 18,446,744,073,709,551,616. Using the above example of a time token cache 31 using 1,000 tokens, the probability of an attacker using a valid time token 42 is approximately $2.70894^{-14}$. Numerically, this is 0.000,000, 000,000,027,089,4 or a chance of less than 1 in 28 quadrillion. The probability of an attacker using a valid time token can be further reduced by increasing the size of the time token 42. Time tokens 42 are a portion of a cryptographic hash output 40. Cryptographic hash outputs 40 cannot be reversed and have no plaintext to compare against. The only way to determine of a cryptographic hash output 40 and thus a time token 42 is valid is to submit the time token 42 to the time token filter 30. This thus limits the number of attack attempts (guesses) to the maximum rate at which time tokens can be fed to the filtered time decryptor 28. For example, if the filtered time decryptor 28 can process one million tokens per second, the probability of an attacker guessing any valid time token 42 is still $2.70894^{-8}$. Numerically, this is 0.000,000,027,089,4 or a chance of less than one in 28 billion.

The time tokens 42 in the time token cache 31 are continuously being refreshed to stay within the time window. When the time window is one second, after one second, all of the time tokens 42 will have been refreshed. This forces the attacker to restart their attack, rendering the one million guesses that have already been made useless as the time tokens 42 in the time token cache 31 have completely changed. The time token filter 30 and the time token cache 31 have been designed to require the same low amount of computational effort if a time token 42 is found or if a time token 42 is not found within the time token cache 13. This is important because it allows the time token filter 30 to easily and quickly separate valid time tokens 42 from invalid time tokens 42.

Finally, in the event that an attacker 52 does produce a time token 42 that is in the time token cache 31, the attacker must still generate an encrypted time message 46 that when decrypted using the time token message key 44 associated with the time token 42, produces a clock value that matches the reduced resolution clock value used to generate the time token 42. This outcome is extremely unlikely.

All of these protections combine together to defend against various types of attack. Message spoofing attacks, where an attacker 52 creates a time token protected message 22, will fail by being filtered out by the time token filter 30. If, in the extremely unlikely case that a spoofed message is not filtered out by the time token filter, it will be filtered out by the message decryptor 32.

Another type of attack is the message replay attack. In a message replay attack, an attacker makes a copy of a valid message generated by a filtered time encryptor 16 and replays the copied message to the receiver 26. Replay attacks are protected against by invalidating a time token 42 in the time token cache 31 when a matching time token 42 is received. This invalidation causes the replayed time token protected message 22 to fail to be recognized, thus protecting the system from message replay attacks.

Another type of attack is the denial of service attack. In a denial of service attack, the attacker 52 attempts to overwhelm the target with high volumes of data. The time token filter 30 and the time token cache 31 have been designed to require the same low amount of computational effort if a time token 42 is found or if a time token 42 is not found within the time token cache 13. This is important because it allows the time token filter 30 to easily and quickly separate valid time tokens 42 from invalid time tokens 42, as is the case during a denial of service attack.

Another type of attack is a the cryptographic performance attack. In a cryptographic performance attack, the attacker 52 sends messages designed to trigger the execution of computationally expensive cryptographic algorithms. This is a form of message spoofing and denial of service attacks. In the present invention, time token protected messages 22 generated by the attacker 52 intended to place additional load on the message decryptor 32 are filtered out by the time token filter 30 as described above. The time token filter 30 in conjunction with the time token cache 31 reduce cryptographic performance attacks to a denial of service or message spoofing attack.

Another type of attack is message delay manipulation. In message delay manipulation, a valid time token protected message 22 produced by a filtered time encryptor 16 is delayed during its traversal of the unsecured communications channel 50. If the delayed time token protected message 22 is received when the time value used to generate the time token 42 is still within the time window, it will be received normally. If the attacker 52 has delayed the time token protected message 22 enough so that it falls outside of the time window, then the time token 42 will be unrecognized. In one embodiment of the present invention, once a time token cache entry has expired, it can be marked invalid but is not removed from the time token cache 31. This allows the time token filter 30 to recognize and detect time token protected messages 22 that have been delayed outside of the time window.

V. Glossary

The following Glossary is provided to teach the reader about the present invention, and to assist them in their comprehension of the Specification and Claims. The definitions are supplied to enhance the reader's understanding, but are not presented to limit the scope of the embodiments of the present invention, or the scope of the Claims. Other suitable definitions may be found in scientific literature pertaining to this field.

Cache—a hardware or software component that stores data so future requests for that data can be served faster; the data stored in a cache might be the result of an earlier computation, or the duplicate of data stored elsewhere.

Clock—A device for time measurement and/or time display.

Clock Drift—A measurement of the difference in frequency between two clocks.

Clock Skew—A measurement of the difference in phase between two clocks.

Clock Value—An indication of time, relative to the epoch of the time source. Clock value is often communicated in seconds and fractions of a second since the epoch.

Content Addressable Memory—A special type of computer memory used in certain very-high-speed searching applications. It is also known as associative memory, associative storage, or associative array, although the last term is more often used for a programming data structure. It compares input search data (tag) against a table of stored data, and returns the address of matching data (or in the case of associative memory, the matching data).

Cryptographic Hash Algorithm—See Cryptographic Hash Function.

Cryptographic Hash Function—a hash function which takes an input, transforms it and returns a fixed-size output. An ideal hash function has three main properties:
1) It is extremely easy to calculate a hash for any given data.
2) It is extremely computationally difficult to calculate an alphanumeric text that has a given hash.
3) It is extremely unlikely that two slightly different inputs will have the same hash.

Cryptographic Key—A key used to encrypt and decrypt a message.

Cryptographic Performance Attack—A cyber attack where a rogue node submits messages that trigger the execution of computationally expensive cryptographic algorithms.

Denial of Service (DoS) Attack—A cyber attack designed to overwhelm a network or device by flooding it with packets.

Epoch—The origin of time for a given time source. For example, for GPS, the epoch is 6 Jan. 1980.

Filtered Time Decryptor—An apparatus for extracting a time value from a secured communication prepared by a Filtered Time Encryptor.

Filtered Time Encryptor—An apparatus for preparing a time value for secure communication.

Full Resolution Clock—A clock reporting at the smallest resolution that can be measured and/or displayed by a given instrument.

GPS—Global Positioning System. A geolocation system that is dependant upon time and can be used to communicate time.

Hash Output—The output from a hash or cryptographic hash function.

Lookup—The process of comparing input search data against a table of stored data, and returning the address of matching data or the matching data itself.

Lower Resolution Clock—A clock reported at a resolution that is less than the maximum that can be measured and/or displayed by a given instrument.

Message—A discrete unit of communication intended by the source for consumption by some recipient or group of recipients.

Message Body—The payload of a message, usually following a message header which identifies the origin and recipients of the message.

Message Delay Manipulation—A cyber attack that operates by delaying messages as they traverse a network.

Message Key—A key used to encrypt and decrypt a message.

Message Replay—See Replay Attack.

Message Spoofing—A cyber attack involving the sending of a message intended to impersonate a legitimate sender.

Non-interactive—Communications or authentication protocols that requires only one party to transmit and another party to receive.

Network—A collection of nodes, that are connected so as to enable communication between the nodes. Nodes use circuit switching, message switching or packet switching to pass the signal through the correct links and nodes to reach the correct destination node. Each node in the network usually has a unique address so messages or connections can be routed to the correct recipients. The collection of addresses in the network is called the address space.

NTP—Network Time Protocol, A protocol for communicating time.

Perfect Forward Secrecy—In security, the property of learning the decryption key for a message does not affect the security of any other message.

Phase Drift—The difference of the phase from a reference.

Plaintext—Un-encrypted information.

Propagation Delay—The amount of time it takes for a signal to travel between two points of measurement.

Propagation Delay Variance—The difference in propagation delay from a reference.

PTP—Precision Time Protocol, A protocol for communicating time. Standardized in IEEE 1588.

Replay Attack—A cyber attack involving the insertion of previously recorded messages.

Resolution—The smallest change that can be measured and/or displayed by a given instrument.

Time—"Time" may be used to specify an instant (time of day) on a selected time-scale. In a time-scale it is a measurement of time interval between two events or the duration of an event. Time is an apparently irreversible continuum of ordered events.

Time Signal—A waveform used for the purpose of communicating time information. The essential physical attributes of a time signal is the concept of an event in time (and space) representing an instant to which a time value is associated.

Time Token—A time sensitive message header that is used to determine the message key. A time token is generated with a specific clock value. The time token is a component of a time token protected message.

Time Token Protected Message—A cryptographically secured message that includes a time token which is used to determine the message key.

Time Token Validity—The determination that a time token is present and valid in a time token cache.

Time Window—A range of time used for recognizing time tokens. The time window depends upon the resolution of the clock values used for token generation and the number of tokens generated.

Unsecured Communications Channel—A method of transferring data that is not resistant to overhearing or tampering.

Scope of the Claims

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Secure Time Communication System have been disclosed above are intended to educate the reader about preferred embodiments of the invention, and are not intended to constrain the limits of the invention or the scope of Claims.

LIST OF REFERENCE CHARACTERS

10 Secure Time Communication System
12 Source Clock
14 Cryptographic Key
16 Filtered Time Encryptor
18 Time Token Generator
20 Message Encryptor
22 Time Token protected message
24 Transmitter
26 Receiver
28 Filtered Time Decryptor
30 Time Token Filter
31 Time Token Cache
32 Message Decryptor
34 Local Clock
40 Cryptographic Hash Output
42 Time Token
44 Time Token Message Key
46 Encrypted Time Message
48 Decrypted Clock
50 Unsecured Communications Channel
52 Attacker

What is claimed is:

1. An apparatus comprising:

a filtered time encryptor, a transmitter, a receiver, and a filtered time decryptor;

said filtered time encryptor including:

means for generating time tokens;

said means for generating time tokens including a source clock and a cryptographic key;

means for message encryption;

said means for message encryption using a time token message key;

said source clock; and said cryptographic key;

said filtered time decryptor including:

means for filtering time tokens;

said means for filtering time tokens using a time token cache;

means for message decryption using said time token message key;

a local clock; and said cryptographic key;

means for filtering time tokens including said time token cache;

said cryptographic key being known to both said filtered time encryptor and said filtered time decryptor;

said means for generating time tokens using said source clock and said cryptographic key to generate said time token and said time token message key;

said means for message encryption generating said encrypted time message using said time token message key to encrypt said source clock;

said filtered time encryptor combining said time token and said encrypted time message into a time token protected message;

said transmitter transmitting said time token protected message;

said receiver receiving said time token protected message;

said filtered time decryptor processing said time token protected message by using said means for filtering time tokens;

said means for filtering time tokens maintaining said time token cache of expected time tokens, associated time token message keys and clock values used to generate said time tokens;

said means for filtering time tokens using said local clock and said cryptographic key to generate said expected time tokens and sari associated time token message keys;

said means for filtering time tokens locating said time token and associated time token message key in said time token cache;

said means for message decryption decrypting said encrypted time message using said associated time token message key as a decryption key; and said filtered time decryptor producing said source clock from said decrypted encrypted titre message.

2. The apparatus as described in claim 1 in which:

a value of said source clock used to generate said time token is of lower resolution than a value of said source clock used to generate said encrypted time message.

3. The apparatus as described in claim 2 in which:

said lower resolution is selected for a purpose of reducing a number of time tokens required to span a time window.

4. The apparatus as described in claim 1 in which:

said filtered time decryptor compares said decrypted clock against said clock value used to generate said time token at a highest resolution common to both clocks; and said filtered time decryptor discards said decrypted clock if said compared clock do not match.

5. The apparatus as described in claim 1 in which:

said means for message encryption generating said encrypted time message using said time token message key to encrypt said source clock includes and to encrypt additional message data.

6. The apparatus as described in claim 1 in which:

using said means for filtering time tokens for providing an efficient filter against cryptographic performance attacks.

7. The apparatus as described in claim 1 in which:

using said means for filtering time tokens for providing an efficient filter against denial of service attacks.

8. The apparatus as described in claim 1 in which:

using said time token message key for providing perfect forward secrecy.

9. The apparatus as described in claim 1 in which:

a size of said time token is selected for a purpose of decreasing a probability of an attacker using a valid time token.

10. The apparatus as described in claim 1 in which:

a number of time tokens in said time token cache is selected for a purpose of spanning a time window.

\* \* \* \* \*